March 22, 1966 K. W. TANTLINGER 3,242,240
METHOD OF INSULATING CAVITIES
Filed April 2, 1962
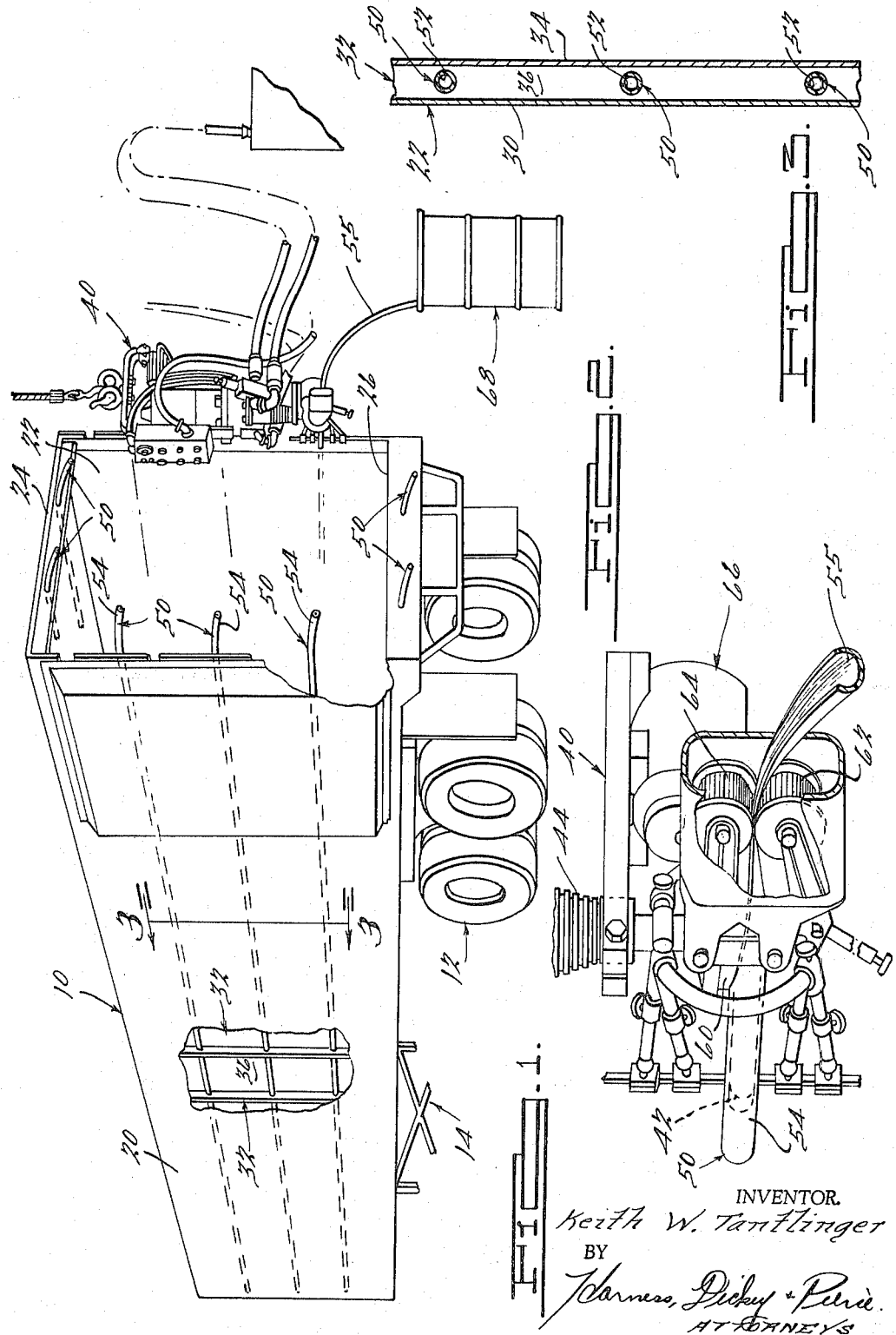
INVENTOR.
Keith W. Tantlinger
BY
Harness, Dickey & Pierce
ATTORNEYS

United States Patent Office 3,242,240
Patented Mar. 22, 1966

3,242,240
METHOD OF INSULATING CAVITIES
Keith W. Tantlinger, Grosse Pointe Shores, Mich., assignor to Fruehauf Corporation, a corporation of Michigan
Filed Apr. 2, 1962, Ser. No. 184,048
2 Claims. (Cl. 264—45)

This invention relates generally to a method for insulating cavities and more particularly to a method for insulating the walls of rail or highway vehicles, shipping containers, or the like.

The shipment of perishable goods over long distances has created the need for improved insulated highway vehicles, rail cars, shipping containers, and the like which maintain their thermal integrity for relatively long periods of time. One way of insulating such vehicles and containers is with foamed-in-place insulation which expands to fill the cavities within the vehicle or container walls with a cellular foam that minimizes heat transfer thereacross. However, such foamed-in-place insulation is relatively expensive and has several characteristics that have necessitated the development of improved insulating techniques.

One undesirable characteristic of foamed-in-place insulation is that the insulation varies in density in the direction in which the foam expands. Further, the expansion limits of presently known and utilized foams are such that the foam must be introduced to the cavities at a multiplicity of points.

For example, it has heretofore been necessary to first pour the foam mix into the floor panels of a trailer centrally of the floor panel. The foam expands laterally of the floor panel to approximately the junction of the floor panel with the vertical side walls. A subsequent pour of the foam mix is made into the side walls whereupon the foam can be made to rise up the side wall to various levels. Where close control of foam density is required, the side walls may have to be foamed in stages. Subsequently, the foam mix is poured into the roof panel at a central location thereof and expands laterally thereof into contact with the foam in the side wall. Obviously, the aforementioned currently employed foaming technique requires a multiplicity of injection points.

A method for insulating cavities, in accordance with an exemplary embodiment of the instant invention, utilizes a plurality of retractable hoses that are built into the trailer wall upon fabrication thereof so as to extend through the cavities therein. The hoses are selectively connectible to a mixing head which is maintained at a single location. The foam mix is injected through the plastic hoses, selectively, at a predetermined rate. The hoses are retracted at a predetermined rate to deposit a controlled amount of foam at a particular location within the cavity being insulated.

Since the plastic hose is relatively inexpensive, it is destroyed upon retraction to facilitate injection of the mix and to minimize the loss of the relatively expensive foam mix. In this manner not only is the insulating process speeded up, but the density of the foamed-in-place insulation is positively controlled.

Accordingly, one object of the instant invention is an improved method of insulating cavities.

Another object is an improved method of insulating the walls of rail or highway vehicles, shipping containers, or the like.

Another object is an improved method of insulating a cavity with foamed-in-place insulation.

Another object is an improved method of controlling the density of foamed-in-place insulation.

Another object is a method of insulating a cavity with foamed-in-place insulation wherein the mixing head for the foam mix is maintained at a relatively fixed position.

Another object of the instant invention is a method of injecting a foam mix through retractable tubes.

Other objects and advantages of the instant invention will become apparent from the following description, claims and drawings, wherein:

FIGURE 1 is a perspective view of a van-type highway trailer provided with the retractable foaming tubes in accordance with an exemplary embodiment of the instant invention;

FIG. 2 is an enlarged perspective view of the mixing head for the foam mix; and

FIG. 3 is a cross-sectional view taken substantially along the line 3—3 of FIGURE 1.

As best seen in FIGURE 1 of the drawings, a van-type highway trailer 10 is provided with a conventional wheel suspension 12 and landing gear 14. The trailer 10 has side walls 20 and 22, a top wall 24, and a floor 26 of sandwich construction having cavities therein.

As best seen in FIGURE 3, the side wall 20, which is exemplary of the side walls 20 and 22, top wall 24, and bottom wall 26, comprises an outer skin 30, a plurality of spaced vertical posts 32 and an inner panel 34. The panels 30 and 34 in conjunction with the posts 32 define cavities 36 into which the foamed-in-place insulation is directed, as will be discussed.

A mixing head 40 has a nozzle portion 42 for the discharge of a foam mix comprising, for example, a resin and an activator. The resin and activator are mixed within a mixing chamber 44 of the head 40, thence injected outwardly of the nozzle 42.

In accordance with the instant invention, a plurality of tubes 50 made, for example, from plastic, are built into the side, top and bottom walls 20, 22, 24 and 26 of the trailer 10 upon fabrication thereof. The tubes 50 run the full length of the trailer 10, extending through complementary apertures 52, in, for example, the vertically extending posts 32 of the side wall 22.

As best seen in FIG. 2, an outer end portion 54 of each tube 50 is successively placed about the injection nozzle 42, thence engaged by a knife-edge 60 on the head 40, which splits the end portion 54 of the tube 50. A portion 55 of the tube 50 is then inserted between a pair of drive rolls 62 and 64 which grip the split end 55 to effect retraction of the tube 50 upon energization of a drive roll motor 66. The split in the tube 50 facilitates insertion of the nozzle portion 42 of the head 40 into an intact portion of the tube 50. The nozzle 42 is sufficiently long to effect a seal with the unsplit portion of the tube 50. The split end 55 of the tube 50 is discarded into, for example, a waste barrel 68.

Foaming of the trailer 10 is easily accomplished by employing the foregoing technique, since the mixing head 40 can be positioned behind the trailer 10, thence connected to the end portions 54 of the tubes 50 in a desired sequence. The foam mix is then pumped through the tube 50 connected to the mixing head 40 at a predetermined flow rate, which flow rate is correlated to the rate of retraction of the tube 50. In this manner, a predetermined quantity of foam mix is deposited at a given location within the cavity 36 defined by the panels 30 and 34 of the wall 22. Splitting of the tube 50 minimizes losses of the foam mix in that the length of tube containing the mix is constantly decreasing to a minimum at the termination of injection through a particular hose. If the inner or discharge end of the tube were to be merely retracted, the entire tube would be filled with foam mix at the termination of injection, resulting in foam loss equal to the volume of the tube.

From the foregoing description, it will be seen that the possibility of voids in the foamed-in-place insulation is minimized, density of the foamed-in-place insulation is positively controlled, and waste of the mix in minimized.

It is to be understood that the specific construction of the improved method of insulating cavities herein disclosed and described is presented for the purpose of explanation and illustration and is not intended to indicate limits of the invention, the scope of which is defined by the following claims.

What is claimed is:

1. A method of insulating a relatively large cavity with foamed-in-place insulation comprising the steps of inserting a flexible tube into said cavity with one end of said tube extending exteriorly of said cavity, positioning a foam mixing head in fixed relatively closely spaced relation to said cavity, securing the one end of said flexible hose to an injection nozzle on said foam mixing head, gripping the one end of said flexible tube with a rotatable retracting mechanism, injecting a foam mixture into the one end of said tube at a controlled flow rate, rotating the retracting mechanism at a controlled rate to effect retraction of the other end of said tube outwardly of said cavity while maintaining the space relationship between the cavity and the mixing head, and correlating the rates of rotation of the retracting mechanism and injection of the foam mix to deposit a predetermined quantity of foam mixture within said cavity.

2. A method of insulating a cavity with foamed-in-place insulation from a remote relatively immovable mixing head comprising the steps of inserting
a flexible tube into said cavity upon fabrication thereof with one end of said tube extending exteriorly of the cavity, moving said cavity and mixing head into close proximate relation securing the one end of said flexible tube to the mixing head, injecting
a foam mixture through said tube into said cavity at a predetermined flow rate, retracting
said tube outwardly of said cavity at a predetermined rate so as to correlate the rates of foam mixture injection and retraction of the tube to deposit a predetermined quantity of foam mixture within said cavity, and splitting
said tube at the mixing head upon retraction thereof relative to the mixing head so as to facilitate injection of the foam mixture into the hose and maintain the length of hose between the mixing head and cavity constant thereby to minimize losses of the foam mixture.

References Cited by the Examiner

UNITED STATES PATENTS

| 2,898,626 | 8/1959 | Alderfer et al. | 156—79 |
| 2,913,772 | 11/1959 | Buchkremer et al. | 18—48 |
| 2,989,790 | 6/1961 | Brown | 20—101 |
| 3,090,078 | 5/1963 | Ackles | 18—59 |

FOREIGN PATENTS

| 665,615 | 1952 | Great Britain. |

FRANK L. ABBOTT, *Primary Examiner.*

JACOB NACKENOFF, *Examiner.*